(12) United States Patent
Stewart et al.

(10) Patent No.: US 10,790,518 B2
(45) Date of Patent: Sep. 29, 2020

(54) ELECTRICAL CONTACT DEVICE FOR A FUEL CELL STACK

(71) Applicants: VOLKSWAGEN AG, Wolfsburg (DE); AUDI AG, Ingolstadt (DE)

(72) Inventors: Ian Stewart, Burnaby (CA); Bevan Hoskyn Moss, Burnaby (CA)

(73) Assignees: VOLKSWAGEN AG, Wolfsburg (DE); AUDI AG, Ingolstadt (DE)

(*) Notice: Subject to any disclaimer, the term of this patent is extended or adjusted under 35 U.S.C. 154(b) by 271 days.

(21) Appl. No.: 15/716,215

(22) Filed: Sep. 26, 2017

(65) Prior Publication Data

US 2018/0090772 A1 Mar. 29, 2018

(30) Foreign Application Priority Data

Sep. 29, 2016 (DE) .................. 10 2016 118 511

(51) Int. Cl.
| | |
|---|---|
| *H01M 8/04858* | (2016.01) |
| *H01M 8/0202* | (2016.01) |
| *H01M 8/0267* | (2016.01) |
| *H01M 8/0228* | (2016.01) |
| *H01M 8/04007* | (2016.01) |
| *H01M 8/24* | (2016.01) |
| *H01M 8/241* | (2016.01) |
| *H01M 8/1018* | (2016.01) |

(52) U.S. Cl.
CPC ....... *H01M 8/0269* (2013.01); *H01M 8/0228* (2013.01); *H01M 8/0267* (2013.01); *H01M 8/04037* (2013.01); *H01M 8/04895* (2013.01); *H01M 8/24* (2013.01); *H01M 8/241* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 2003/0022046 A1 | 1/2003 | Hayashi et al. | |
| 2005/0058865 A1* | 3/2005 | Thompson | H01M 8/0258 |
| | | | 429/429 |

FOREIGN PATENT DOCUMENTS

| | | |
|---|---|---|
| WO | 2004/064182 A2 | 7/2004 |
| WO | 2005/038947 A2 | 4/2005 |
| WO | 2016/118740 A1 | 7/2016 |

* cited by examiner

*Primary Examiner* — Haixia Zhang
(74) *Attorney, Agent, or Firm* — Seed Intellectual Property Law Group LLP

(57) ABSTRACT

An electrical contact device for the diversion of electrical current from a fuel cell stack can have a plurality of electrically conductive contact regions which are delineated from each other. A plurality of electrically conductive first contact structures connects each, or a plurality of, the contact region(s) to an external load current circuit. Via at least one switching element arranged in a first contact structure, an electrically conductive connection may be disconnected by the first contact structure, in particular between at least one contact region and a load current circuit. In this way it is possible to adjust the overall resistance of the contact structure, and thus the Joule heat produced in the contact regions. Second contact structures that are arranged between the contact regions enable a further increased variability of the overall electrical resistance of the contact device.

20 Claims, 3 Drawing Sheets

ELECTRICAL CONTACT DEVICE FOR A FUEL CELL STACK

BACKGROUND

Technical Field

The present disclosure relates to an electrical contact device for a fuel cell stack, and to a fuel cell stack including such an electrical contact device.

Description of the Related Art

Fuel cells use the chemical conversion of a fuel with oxygen to water to generate electrical energy. For this reason, fuel cells have as a core component a membrane electrode assembly (MEA) having a membrane electrode unit. The latter is formed by a proton-conducting membrane, on both sides of which are arranged catalytic electrodes. In this arrangement, the membrane separates the anode chamber associated with the anode and the cathode chamber associated with the cathode from each other in a gas-tight manner and insulates them electrically. It is also possible to arrange gas diffusion layers on the sides of the electrodes that do not face toward the membrane.

During operation of the fuel cell, a fuel containing hydrogen is supplied to the anode, at which an electrochemical oxidation of $H_2$ to $H^+$ with release of electrons occurs. There is a hydrous or anhydrous transport of $H^+$ protons across the electrolytic membrane, from the anode chamber into the cathode chamber. The electrons provided at the anode are guided to the cathode via an electrical line. The cathode is supplied with an operating medium containing oxygen so that a reduction of $O_2$ to $O_2^-$ with uptake of electrons occurs there. These oxygen anions react in the cathode chamber with the protons transported across the membrane to form water. The direct conversion of chemical energy into electrical energy is not limited by the Carnot factor, and therefore has an improved efficiency compared to other heat engines.

A fuel cell stack is normally formed by a plurality of MEAs arranged in a stack, the electrical power outputs of which are added. Typically arranged between the membrane electrode assemblies are bipolar plates which ensure a supply of the reactants and a cooling liquid to the individual MEAs and function as an electrically conductive contact with the membrane electrode assemblies.

The fuel cell stack is supplied with its operating media, that is the anode operating gas (hydrogen for example), the cathode operating gas (air for example), and the coolant, by means of the main supply channels which run through the stack in its entire stack direction (S in FIG. 1) and from which the operating media are supplied to the individual cells via the bipolar plates. There are at least two such main supply channels available for each operating medium, namely one for supplying and one for discharging the respective operating medium. Each membrane-electrode arrangement and each bipolar plate thus has operating media passages for the formation of main supply channels.

The operating medium passages are in particular an anode inlet opening for supplying the anode gas and an anode outlet opening for discharging the anode gas, a cathode inlet opening for supplying the cathode gas and a cathode outlet opening for discharging the cathode gas, and a coolant inlet opening for supplying the coolant and a coolant outlet opening for discharging the coolant. In a fuel cell stack, these operating medium passages are aligned congruently with each other and form the main supply channels for the operating media running through the entire stack.

End plates or unipolar plates are arranged at both ends of the fuel cell stack in order to hold it together and press the stack components together. The compression pressure contributes to sealing of the stack and ensures adequate electrical contact between the stack components. At least one of the monopolar plates also has operating medium openings.

A fuel cell stack according to the prior art is schematically depicted in FIG. 1. Fuel cell stack 10 has a plurality of fuel cells 14, two end plates 16, and tensioning elements 18. Each individual cell 14 has an MEA 20 with a proton-conducting membrane 22 (polymer electrolyte membrane) and electrodes arranged on both sides of it (anode and cathode; not depicted). The electrodes are each arranged between the membrane 22 and a gas diffusion layer 24 and are applied as layers on both sides of the membrane 22 or connected via gas diffusion layers 24 to what are known as gas-diffusion electrodes.

Each membrane-electrode unit 20 is arranged between two bipolar plates 26 and is supplied by these with the operating media via the gas diffusion layers 24. For this purpose, the bipolar plates 26 have flow fields connected to the operating medium passages. In addition, two adjoining membrane-electrode units 20 are electrically conductively connected via the bipolar plate 26 located between them and are connected in series. Each end plate 26, also called a monopolar plate, is designed on one side for supplying an MEA 20 adjacent to this side with operating media.

The current collection from fuel cell stack 10, or the connection of stack 10 to an electrical load, is done by electrical contact devices, also referred to as bus plates. They are usually arranged at the opposite ends of the fuel cell stack 10. The contact devices may be arranged between outer, terminal, or marginal fuel cells 14 and the respective end plates 16. Alternatively, the bus plates are combined with end plates 16 and designed, for example, as a conductive layer applied to the end plates 16.

FIGS. 2 and 3 depict an end plate 16 having a first main surface 28 and a second main surface 29 according to the prior art. Arranged in a recess of first main surface 28 is a conductive layer 30 as an electrical contact device. When the end plate 16 is in the installation position in a fuel cell stack 10, the first main surface 28 faces toward a marginal fuel cell 14. The conductive layer 30 fills out nearly the entire first main surface 28 and additionally extends onto a connection element 31 that projects in the lateral direction across the stack 10. Only one marginal or peripheral region of the first main surface 28 remains free of the conductive layer 30 in order to electrically insulate the stack 10 in the lateral direction, except for the contact element 31. The layer 30 is electrically connected to the marginal fuel cell 14, at least after the pressing of stack 10. A fuel cell stack 10 that has such end plates 16 on both ends and whose fuel cells 14 are electrically connected to each other can be electrically contacted as a whole via the connection element 31.

During its operation, a fuel cell stack loses heat to the environment, in particular through its end plates. Temperatures of the end plates are therefore normally lower than that of the remaining stack. The danger therefore exists that water from the operating media or exhaust gases condenses out on the end plates. This condensation water can block flow channels, for example in the flow fields of the bipolar plate, and thus reduce the efficiency of the fuel cell stack. It is therefore known to heat the end plates of a fuel cell stack in order to achieve a uniform temperature distribution over the entire stack. Heating devices used for this purpose may also be used to assist in a cold weather start of the fuel cell stack. According to the prior art, resistance heating elements in particular are used as heating elements.

A fuel cell stack is known from WO 2004/064182 A1, wherein a resistance heating element is arranged between each end plate and an electrical contact device (bus plate). The resistance heating element and the electrical contact device are thereby connected in parallel. WO 2005/038947 A1 discloses a fuel cell stack having resistance heating elements that are embedded into recesses of the bus plates and through which current generated by the fuel cell stack flows as a function of the regulation ratio of a thermal switch.

BRIEF SUMMARY

According to the prior art, in order to ensure a variable heating of the ends of the stack, separate components are therefore always used for the contact device and for the end plate heating.

The present disclosure is then directed to overcoming the disadvantages of the prior art and providing an electrical contact device for a fuel cell stack that has a reduced installation space requirement and enables a variable heating of the stack end plates.

This object is achieved by an electrical contact device and a fuel cell stack having the features described herein.

A first aspect of the present disclosure relates to an electrical contact device for the diversion of electrical current from a fuel cell stack having a plurality of electrically conductive contact regions, in particular electrically conductive contact regions that are delimited from each other. The contact regions are configured for the contacting of marginal fuel cells of a fuel cell stack. The contact regions are preferably designed as an electrically conductive thin layer. Especially preferred are the contact regions as a thin layer made of a conductive metal, such as aluminum or copper, or made of a conductive polymer. The contact device can furthermore have a carrier, preferably an electrically insulating carrier, on which the contact regions are arranged. Preferably, the contact regions arranged on the carrier have a (lateral) spacing relative to one another in the plane of the carrier. The carrier may be a stack end plate or an insulation layer arranged between the stack end plate and a marginal fuel cell.

Furthermore, the contact regions are dimensioned and designed in such a way that target temperatures, determined on the basis of the Joule heat produced in the contact regions as a result of the voltages produced in the working region of the fuel cell stack, occur in the contact regions. The temperature of the contact regions is therefore a function of the voltage produced by the fuel cell stack at the particular time and, therefore, may vary over the working region of the fuel cell stack. The selection of the material, the layer thickness and/or the lateral dimensioning of the contact regions can affect the Joule heat produced at a specific voltage in the contact regions.

A plurality of electrically conductive first contact structures is arranged between each, or a plurality of, contact region(s) and an external load current circuit. The first contact structures are configured for the diversion of the electrical charges collected via the contact regions. An electrical consumer to which the electrical charges generated by the fuel cell stack are supplied is preferably arranged in the load current circuit. The first contact structures may, for example, be wiring harnesses, metallizations or conductor traces. The first contact structures can thereby be individually connected to the load current circuit or first be bundled and be connected in the bundle to the load current circuit.

According to another aspect of the present disclosure, the electrical contact device has at least one switching element arranged within a first contact structure for the disconnection of an electrically conductive connection via the first contact structure. In other words, the switching element is configured to interrupt a flow of current through the first contact structures. The switching element is thereby arranged within the first contact structure or between the first contact structure and the load current circuit. In the case of bundled first contact structures, the switching element may also be arranged within the bundle or between the bundle and the load current circuit. The switching element may, for example, be transistors, relays, reed switch elements or bimetallic switching elements, or other remote control switching contacts which require no manual operation.

The electrical contact device according to the present disclosure thus enables disconnection of at least one contact region from the load current circuit by operation of the at least one switching element. Because of the associated reduction in the surface area available for the diversion of electrical charges, the electrical resistance, in particular the contact resistance, of the contact device thereby increases. Because of the increased resistance, there is an increased buildup of heat in the at least one contact region still connected to the load current circuit. In particular when the output voltage of the fuel cell stack remains consistent, an increase in the Joule heat results in the contact region still connected to the load current circuit.

The contact regions of the electrical contact device thereby serve both for the diversion of charges from the fuel cell stack and as a resistance heating element for the production of heat. The installation space requirement of the electrical contact device is thus minimal. The switching element makes it possible to disconnect individual contact regions from the load current circuit, and thus to adjust the contact device resistance. A variable heating of the stack end plates is consequently enabled. For example, during a cold weather start, a high resistance of the contact device may be set at first in order to heat the stack end plates. Then the resistance is reduced, and the efficiency of the stack thus increases.

In a preferred embodiment of the contact device, this also has electrically conductive second contact structures. These are respectively arranged between two contact regions, or respectively connect two contact regions to each other in an electrically conductive manner. The second contact structures may also be wiring harnesses, metallizations or conductor traces. According to this embodiment, the operation of the first switching element does not inevitably result in a reduction in size of the contact regions available for the diversion of charges. By contrast, the parallel circuit of the contact regions respectively connected via first contact structures to the load current circuit is converted into a series circuit of the contact regions insofar as the latter are connected to each other via the second contact structures. This results in a change of the overall resistance of the electrical contact device, and thus a change of the Joule heat produced in the contact device. According to this embodiment, the entire surface of the contact regions is advantageously maintained for the diversion of the charge produced by the stack, and nevertheless the resistance of the contact device is variable.

In an especially preferred embodiment of the electrical contact device, the second contact structures have an electrical resistance that differs from the electrical resistance of the first contact structures. In particular, the second contact structures have a specific electrical resistance that differs from the specific electrical resistance of the first contact structures. Preferably, the first contact structures have an electrical resistance that differs from the electrical resistance of the second contact structures by at least 10%, preferably by at least 20% and especially preferably by at least 30% (in relation to the resistance of the second contact structures). Especially preferably, the electrical resistance of the second contact structures is higher than the resistance of the first contact structures.

The direct connection between at least one contact region and the load current circuit via the first contact structure may be disconnected by operation of the at least one switching element. Then the current flows from this contact region across at least one second contact structure, an adjacent contact region, and finally across the first contact structure connected to this contact region, into the load current circuit. Because of the differing electrical resistances of the first and second contact structures, the operation of the at least one switching element substantially modifies the overall resistance of the contact device. In particular when the second contact elements have an increased resistance, there is a substantially higher overall resistance of the contact device in the series circuit of the contact regions.

Differing resistances of the first and second contact structures may be achieved in a variety of ways, for example by use of different materials and/or different material thicknesses. When identical or similar conductor elements are used for the first and second contact structures, they may also differ in the number of conductor elements. Especially preferably, the contact regions are formed by thin conductive layers and the second contact structures are of the same material as the contact regions, but with thinner layer thickness and/or with nonconductive cutouts. Likewise preferably, the first contact structures are also formed by thin layers, and the switching element is integrated into the thin layers, for example as a thin film transistor. Especially preferably, at least the first contact regions, the second contact structures and/or the second contact regions (if present) are formed as thin conductive layers of the same material, wherein the first contact regions have a greater layer thickness than the second contact structures and/or than the second contact regions. In other words, the first contact regions have a lower electrical resistance than the second contact structures and/or the second contact regions.

In a likewise preferred embodiment of the electrical contact device, the plurality of electrically conductive contact regions has at least one first contact region and at least one second contact region, wherein the second contact regions have an electrical resistance that differs from the electrical resistance of the first contact structures. The variability of the overall resistance of the electrical contact device is thus further increased. Moreover, the electrical resistance of the contact device may be locally adjusted by adjusting the electrical resistances of the contact regions. Therefore, targeted specific temperature distributions may be set on the contact device and/or an adjacent end plate or fuel cell. For example, a resistance gradient in a specific direction of the electrical contact device, and thus a temperature gradient along the contact device and/or an adjacent end plate or fuel cell, may be set by gradually adjusting the resistances of the contact regions. The variation of the electrical resistances can be achieved by adaptation of material and/or layer thickness of the contact regions.

In an especially preferred embodiment, the contact device has a plurality of first contact regions and a plurality of second contact regions, and at least one switching element arranged between the plurality of second contact regions and the external load current circuit. The first contact regions in this arrangement preferably have a different electrical resistance than the second contact regions. For example, a plurality of first contact regions may be electrically conductively connected to a load current circuit via a first bundle of first contact structures, and a plurality of second contact regions may be connected to the load current circuit via a second bundle of first contact structures. If at least one switching element is arranged in the first bundle of first contact structures, the plurality of first contact regions is disconnected from the load current circuit by operation of the switching element. In this way, the overall resistance of the contact device, and thus the Joule heat produced by it at constant voltage, is substantially increased. This increase may be strengthened or reduced by adjustment of the resistances of the first contact regions relative to the second contact regions. According to this embodiment, the first and second contact regions are especially preferably each designed in the shape of finger structures that engage with one another. A homogeneous current extraction via the contact device is thus ensured regardless of the state of the switching element.

According to a likewise preferred embodiment of the electrical contact device, a plurality of electrically conductive first contact structures is arranged between each contact region and an external load current circuit. In other words, a switching element is arranged between each contact region and the external load current circuit. Each switching element here is designed for the disconnection of an electrically conductive connection via the first contact structure in which it is arranged. This embodiment likewise enables an adjustment in small increments of the overall resistance of the contact device. Furthermore, this embodiment enables a targeted adjustment of the resistance in specific regions of the contact device, or in specific regions of a stack end plate connected thereto.

The switching elements are especially preferably adjustable and/or controllable switching elements. Especially preferably, the switching elements are configured to be opened with a switching frequency f, meaning to periodically disconnect the electrically conductive connection via at least one first contact structure. In other words, the switching elements are preferably configured to be opened always for a specific span of time (pulse duration) after expiration of a first period duration. The ratio of period duration to pulse duration, in other words the duty cycle, thus determines the average electrical resistance over time of the electric contact structure. Especially preferably, the setting of an average electrical resistance of the contact device is accomplished by control or adjustment of the duty cycle of the at least one switching element. Likewise preferably, the electrical contact device has a control unit configured for adjusting or controlling the duty cycle of the at least one switching element, or is connected to such a control unit.

A second aspect of the present disclosure relates to a fuel cell stack having a plurality of fuel cells stacked in a stack direction and an electrical contact device as described above. The contact device is thereby in electrical contact with a fuel cell arranged toward the outside in a stack direction, that is, a marginal fuel cell. The stack direction thereby preferably corresponds to the direction normal of a surface of the stacked fuel cells that is most extensive in terms of surface area. Preferably, the fuel cell stack has two contact devices according to the present disclosure, each of which contacts a marginal fuel cell at opposite ends of the stack. The aforementioned load current circuit then connects the two contact structures to an electrical consumer outside of the fuel cell stack. Therefore, the electrical charges released in the stack may be supplied via the contact devices to a consumer arranged in the load current circuit. The contact regions preferably correspond (essentially) to the active regions of the fuel cell and/or the flow fields of the bipolar plates. Simultaneously, the contact devices serve as resistance heaters and have an adjustable overall resistance and thus (at the same voltage level) an adjustable heat output.

In a preferred embodiment of the fuel cell stack, it has an end plate with a first main surface in contact with the fuel cell arranged toward the outside and a second main surface opposite the first main surface. The contact device is then preferably arranged on or in the first main surface of the end plate. An electrically insulating layer may be arranged between end plate and contact device. Likewise preferably, this insulating layer is the carrier for the contact regions, which are designed, for example, in the shape of a thin electrically conductive layer, preferably as a thin layer metallization.

Likewise preferably, the contact device is arranged on or relative to the end plate in such a manner that it is disposed between operating medium inlet openings and operating medium discharge openings of the end plate. According to this embodiment, the electrical resistance of the electrical contact device preferably declines in a direction from the operating medium inlet openings toward the operating medium discharge openings. The variation of the overall resistance is thereby accomplished as described above, for example by arrangement of a plurality of contact regions having declining electrical resistance between operating medium inlet openings and operating medium discharge openings. Therefore, the contact device heats the end plate more intensively in the vicinity of the operating medium inlet openings than in the vicinity of the operating medium discharge openings. Therefore, a temperature distribution of the end plate, and thus preferably also a water distribution along the end plate, may be homogenized.

The various embodiments of the present disclosure mentioned in this application may be combined advantageously with one another unless stated otherwise in individual cases.

BRIEF DESCRIPTION OF THE SEVERAL VIEWS OF THE DRAWINGS

The detailed description proceeds below in exemplary embodiments on the basis of the respective drawings. The following is shown.

DETAILED DESCRIPTION

Figure 1:
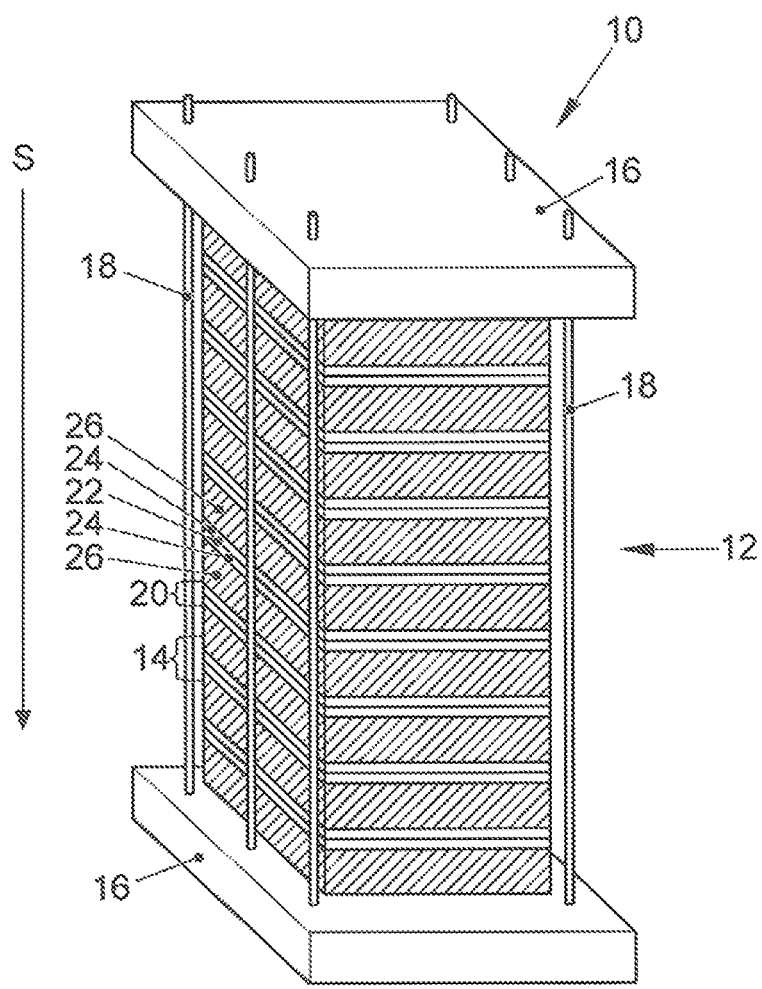
FIG. 1 illustrates a schematic perspective view of a fuel cell stack according to the prior art.
Figure 2:
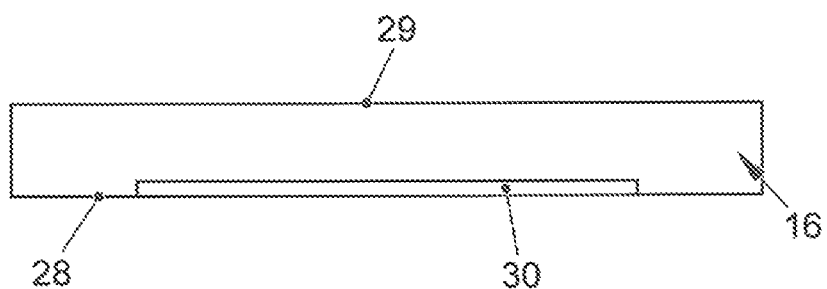
FIG. 2 illustrates a schematic cross-section of an end plate according to the prior art.
Figure 3:
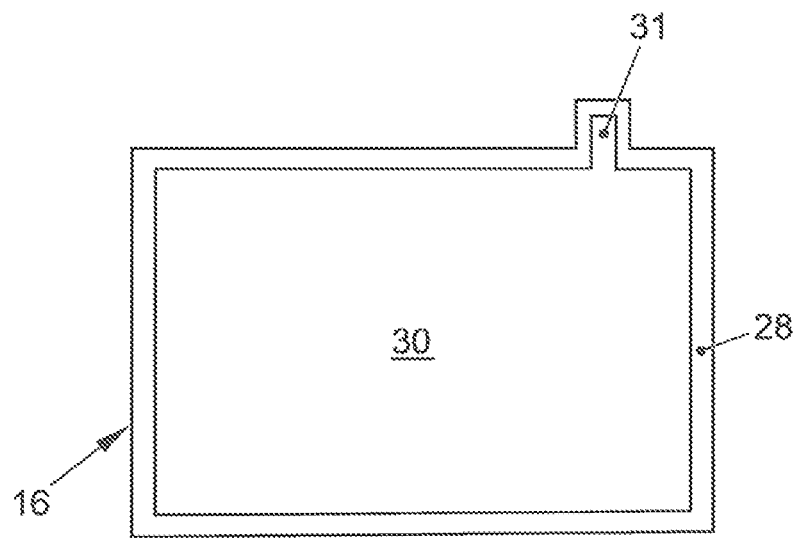
FIG. 3 illustrates a schematic top view of an end plate according to the prior art.

FIGS. 1, 2 and 3 were already discussed for the explanation of the prior art. The fuel cell stack 10 according to the present disclosure may in principle have a structure according to FIG. 1, and its end plate may in principle have a cross-section according to FIG. 2.

Figure 4:
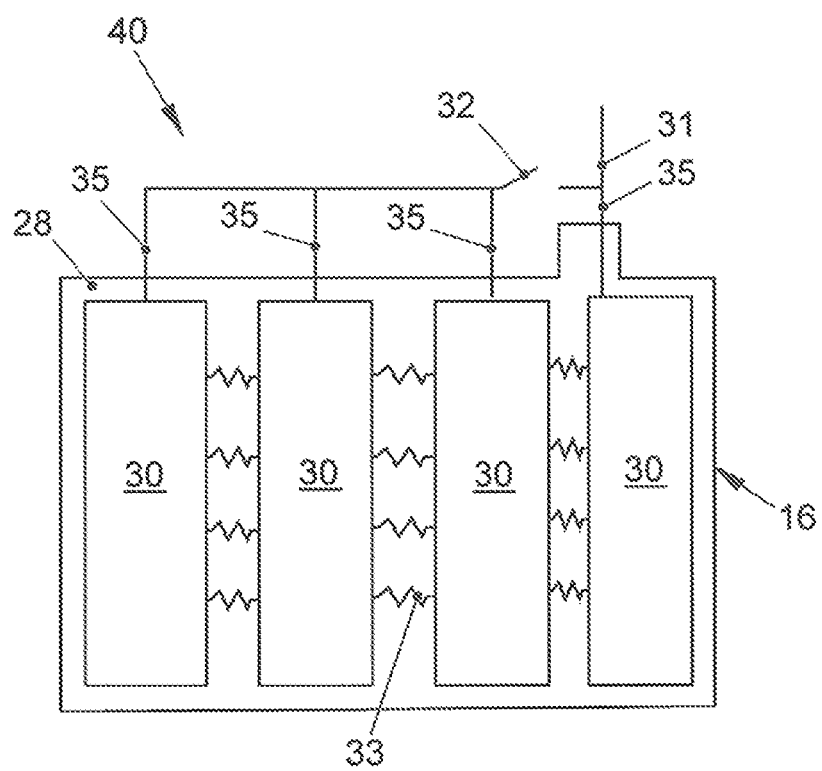
FIG. 4 illustrates a schematic top view of an end plate according to a first embodiment.

FIG. 4 shows an electrical contact device 40 according to a first embodiment. Contact device 40 may be arranged in one or a plurality of recesses of first main surface 28 of an end plate 16, as depicted in FIG. 2. Alternatively, contact device 40 may be arranged above the first main surface 28 of end plate 16, and an elastic insulating film may be arranged between contact device 40 and end plate 16.

The contact device according to the first embodiment has four contact regions 30 which are formed by thin copper layers. The copper layers 30 were preferably electrostatically deposited on end plate 16 or on an insulation plate arranged between end plate 16 and contact structure 40. Each of the contact regions 30 is connected via a first contact structure 35 to an external load current circuit 31, of which only a section is depicted. A contact region 30 arranged toward the outside is directly connected to load current circuit 31 via a first contact structure 35. The first contact structures 35 connected to the remaining three contact regions 30 are electrically or conductively coupled to one another, or "bundled," and a switching element 32 is arranged between the bundle and external load current circuit 31.

Second contact structures 33 are each arranged between two contact regions 30 and create a further electrically conductive connection between them. Second contact structures 33 are only indicated in FIG. 4 and may be formed by strip-shaped metallizations made of copper, a copper alloy or a different metal. Second contact structures 33 may have a reduced layer thickness compared to contact regions 30. The three contact structures 33, each of which is depicted between two contact regions, and their shape serve only for illustration; the actual number and shape of the second contact structures may deviate from this.

In a first working position, switching element 32 creates an electrically conductive connection between external load current circuit 31 and bundled first contact structures 35. All four contact regions 30 are thus connected in parallel with respect to external load current circuit 31. In the depicted second working position of switching element 32, it interrupts an electrically conductive connection between external load current circuit 31 and bundled first contact structures 35. Thus, only contact region 30 toward the outside is still directly connected to load current circuit 31, whereas the remaining three contact structures 30 are connected via second contact structures 33 to each other, to the contact region toward the outside 30, and thus to load current circuit 31. Consequently, contact regions 30 are connected in series with respect to external load current circuit 31 when switching element 32 is in the second working position.

The resistance of contact device 40 is thus higher when switching element 32 is in the second working position than when it is in its first working position. Therefore, at the same voltage level, when the charges produced in a fuel cell stack 10 are diverted via contact regions 30, more Joule heat is produced when switching element 32 is in the second working position than when switching element 32 is in the first working position. Contact device 40 thus serves on the one hand as a bus plate for electrical contacting of a fuel cell stack 10, and on the other hand as a resistance heating element with variable heat output. The difference of the heat output in the first and second working positions of switching element 32 is intensified if first contact structures 35 have a lower electrical resistance than the second contact structures.

Figure 5:
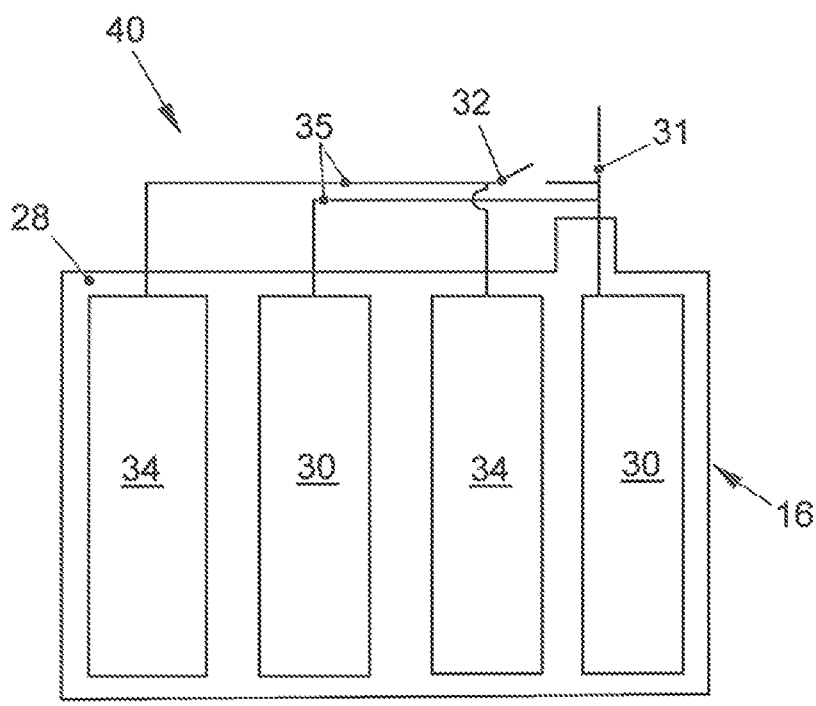
FIG. 5 illustrates a schematic top view of an end plate according to a second embodiment.

In contrast to FIG. 4, the second embodiment of an electrical contact device 40 according to the present disclosure which is shown in FIG. 5 has a plurality of first contact regions 30 and a plurality of second contact regions 34. The first and second contact regions 30, 34 engage with one another in the manner of fingers. First contact structures 35 connected to first contact regions 30 are bundled, just as are first contact structures 35 connected to second contact regions 34. Bundled first contact regions 30 are simply connected to load current circuit 31, whereas a switching element 32 is arranged between bundled second contact regions 34 and load current circuit 31. In contrast to the embodiment shown in FIG. 4, the contact device 40 shown in FIG. 5 has no second contact structures 33.

In a first working position of switching element 32, it produces an electrically conductive connection between the bundle of first contact structures 35, which are connected to second contact regions 34, and load current circuit 31. In this working position, first and second contact regions 30, 34 are connected in parallel with respect to load current circuit 31. In the depicted second working position of switching element 32, it disconnects the direct connection between second contact regions 34 and load current circuit 31. Thus, only first contact regions 30 remain connected to load current circuit 31. Second contact regions 34 have a lower electrical resistance than first contact regions 30. Therefore, the overall resistance, and thus at an unchanged voltage level the heat output of contact device 40, is substantially higher when switching element 32 is in the second working position than when it is in its first working position. Because of the alternating arrangement of first and second contact regions 30, 34, the current nevertheless continues to be diverted uniformly over the entire surface of the contacting device.

The third embodiment of an electrical contact device 40 according to the present disclosure as shown in FIG. 6 again has four uniform contact regions 30. Each contact region 30 is connected via a first contact structure 35 to an external load current circuit 31, wherein a switching element 32 is arranged in each first contact structure 35 between each contact region 30 and the load current circuit 31. Therefore, a direct connection can be either disconnected or established between each contact region 30 and load current circuit 31 by operation of the respectively associated switching element 32. The number of contact regions 30 that are connected in parallel with respect to the load current circuit is therefore variable.

Figure 6:
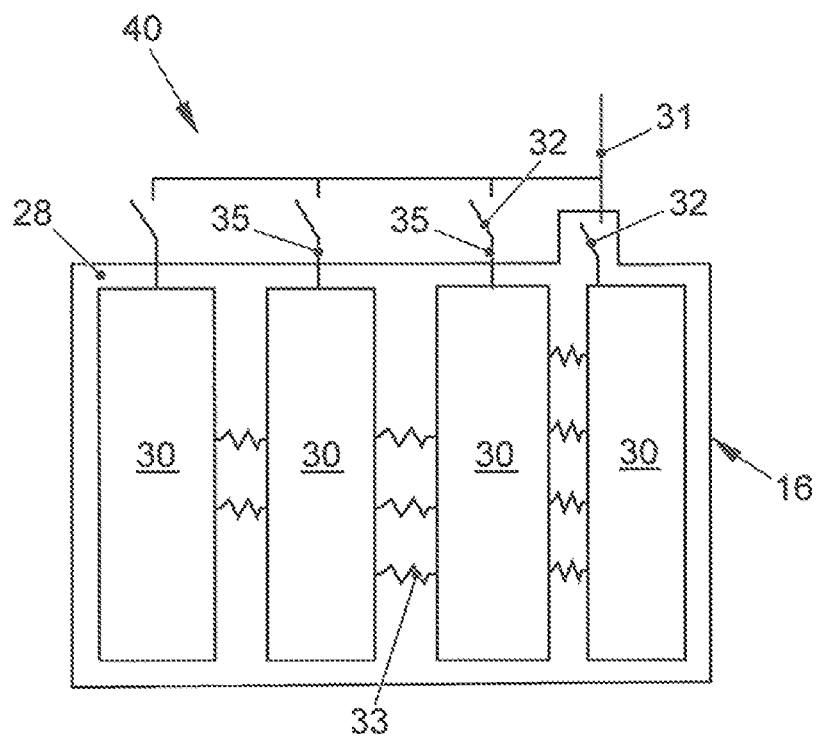
FIG. 6 illustrates a schematic top view of an end plate according to a third embodiment.

Second contact structures 33 each connect two adjacent contact regions 30 to each other in an electrically conductive manner. In this arrangement, the electrical resistance of second contact structures 33 varies within contact device 40. In FIG. 6, this is depicted by variation of the number of second contact structures 33 that are arranged between contact regions 30. The fewer contact structures 33 provided between two contact regions 30, the higher the electrical resistance between these contact regions 30.

An interconnection situation as depicted in FIG. 4 can be produced if all switching elements 32, except for an outermost arranged switching element 32, disconnect an electrical connection between associated contact region 30 and load current circuit 31. In this situation, all contact regions 30 are thus connected in series with reference to load current circuit 31, and hence the overall resistance and the heating output of contact device 40 are at a maximum. In addition, the decline in the number of second contact structures 33 as the distance increases from contact region 30, which is directly connected to load current circuit 31, produces an increasing resistance, and thus an increasing heating output, as the distance increases from contact region 30, which is directly connected to load current circuit 31. Consequently, this produces a temperature gradient across contact device 40. Depending on the operating state of stack 10, this can serve, for example, to homogenize a water distribution at end plate 16.

German patent application no. 10 2016 118 511.6, filed Sep. 29, 2016, is hereby incorporated herein by reference, in its entirety. The various embodiments described above can be combined to provide further embodiments. These and other changes can be made to the embodiments in light of the above detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electrical contact device for diversion of electrical current from a fuel cell stack, comprising:
a plurality of electrically conductive contact regions;
a plurality of electrically conductive first contact structures, each of the first contact structures connecting at least one of the contact regions to an external load current circuit; and
at least one switching element arranged within at least one of the first contact structures for disconnection of an electrically conductive connection via the at least one of the first contact structures,
wherein the contact regions, the first contact structures, and the switching element are each arranged on a surface of a single end plate of the fuel cell stack.

2. The electrical contact device according to claim 1, further comprising electrically conductive second contact structures for connection of two respective contact regions.

3. The electrical contact device according to claim 2 wherein the second contact structures have a different electrical resistance than the first contact structures.

4. The electrical contact device according to claim 1 wherein the plurality of electrically conductive contact regions has at least one first contact region and at least one second contact region, and wherein the at least one first contact region has a different electrical resistance than the at least one second contact region.

5. The electrical contact device according to claim 4, further comprising a plurality of first contact regions and a plurality of second contact regions, and at least one switching element arranged between the plurality of second contact regions and the external load current circuit.

6. The electrical contact device according to claim 1 wherein each of the first contact structures electrically couples a respective one of the contact regions to the external load current circuit, and wherein each of the first contact structures includes a respective switching element for disconnection of an electrically conductive connection of the respective first contact structure.

7. The electrical contact device according to claim 1 wherein each of the plurality of electrically conductive contact regions includes an electrically conductive thin layer.

8. The electrical contact device according to claim 4 wherein at least the first contact regions, electrically conductive second contact structures for connection of two respective contact regions, and the second contact regions are formed as thin conductive layers of the same material, wherein the first contact regions have a greater layer thickness than the second contact structures or the second contact regions.

9. The electrical contact device according to claim 8 wherein the first contact regions have a greater layer thickness than the second contact structures and the second contact regions.

10. The electrical contact device according to claim 1, further comprising a control unit configured for closed-loop or open-loop control of a duty cycle of the at least one switching element.

11. A fuel cell stack comprising a first end plate, a second end plate, a plurality of fuel cells stacked in a stack direction from the first end plate to the second end plate, and an electrical contact device in electrical contact with a marginal fuel cell of the fuel cell stack that is arranged toward the outside in the stack direction, the electrical contact device comprising:
  a plurality of electrically conductive contact regions;
  a plurality of electrically conductive first contact structures, each of the first contact structures connecting at least one of the contact regions to an external load current circuit; and
  at least one switching element arranged within at least one of the first contact structures for disconnection of an electrically conductive connection via the at least one of the first contact structures,
  wherein the contact regions, the first contact structures, and the switching element are each arranged on a surface of the first end plate.

12. The fuel cell stack according to claim 11, further comprising electrically conductive second contact structures for connection of two respective contact regions.

13. The fuel cell stack according to claim 12 wherein the second contact structures have a different electrical resistance than the first contact structures.

14. The fuel cell stack according to claim 11 wherein the plurality of electrically conductive contact regions has at least one first contact region and at least one second contact region, and wherein the at least one first contact region has a different electrical resistance than the at least one second contact region.

15. The fuel cell stack according to claim 14, further comprising a plurality of first contact regions and a plurality of second contact regions, and at least one switching element arranged between the plurality of second contact regions and the external load current circuit.

16. The fuel cell stack according to claim 11 wherein each of the first contact structures electrically couples a respective one of the contact regions to the external load current circuit, and wherein each of the first contact structures includes a respective switching element for disconnection of an electrically conductive connection of the respective first contact structure.

17. The fuel cell stack according to claim 11 wherein each of the plurality of electrically conductive contact regions includes an electrically conductive thin layer.

18. An electrical contact device for diversion of electrical current from a fuel cell stack, comprising:
  a plurality of electrically conductive contact regions;
  a plurality of electrically conductive first contact structures; and
  at least one switching element arranged within at least one of the first contact structures for disconnection of an electrically conductive connection via the at least one of the first contact structures,
  wherein the contact regions, the first contact structures, and the switching element are each arranged on a surface of a single end plate of the fuel cell stack.

19. The electrical contact device according to claim 18 wherein each of the first contact structures connect at least one of the contact regions to an external load current circuit and the at least one switching element is arranged to disconnect an electrically conductive connection via the at least one of the first contact structures to the external load current circuit.

20. The fuel cell stack according to claim 11 wherein the electrical contact device is a first electrical contact device and the marginal fuel cell is a first marginal fuel cell, and wherein the fuel cell stack further comprises a second electrical contact device in electrical contact with a second marginal fuel cell of the fuel cell stack that is arranged opposite the first marginal fuel cell in the stack direction, the second electrical contact device comprising:
  a plurality of electrically conductive second contact regions;
  a plurality of electrically conductive second contact structures, each of the second contact structures connecting at least one of the second contact regions to the external load current circuit; and
  at least one second switching element arranged within at least one of the second contact structures for disconnection of an electrically conductive connection via the at least one of the second contact structures,
  wherein the second contact regions, the second contact structures, and the second switching element are each arranged on a surface of the second end plate.

* * * * *